3,810,855
POLYMER DISPERSIONS AND PROCESS FOR
PREPARATION OF THE SAME
Hideyoshi Tugukuni, Sakai, and Mitsuhiro Matsuda,
Tondabayashi, Japan, assignors to Dai Nippon Toryo
Co., Ltd., Osaka-shi, Japan
Filed Oct. 5, 1972, Ser. No. 295,198
Claims priority, application Japan, July 7, 1972,
47/68,038
Int. Cl. C09d 3/58, 3/64, 5/02
U.S. Cl. 260—22 CB        16 Claims

ABSTRACT OF THE DISCLOSURE

This invention relates to a polymer dispersion useful especially as a coating composition, which comprises an organic liquid as a dispersion medium and an oil-modified epoxyester resin, oil-modified epoxy-modified alkyd resin, urethanated oil resin, maleic oil resin or oil-modified alkyd resin, said resin being solvated with the organic liquid and being block- or graft-polymerized with copolymerizable monomers, and to a process for the preparation of such polymer dispersion. This invention relates also to a polymer dispersion of the above type, in which an organic liquid having an aniline point below 60° C. and an aromatic hydrocarbon content of less than 12% by weight is used as the dispersion medium.

BACKGROUND OF THE INVENTION

(i) Field of the invention

This invention relates to a synthetic copolymer dispersion and a process for the preparation thereof. More particularly, the invention relates to a polymer dispersion of low viscosity and high non-volatile content which can give a film excellent in solvent resistance, chemical resistance and water resistance when used as a coating comsition.

(ii) Description of the prior art

Organic solvent solutions of alkyd resins modified with styrene or other vinyl type monomers, namely so-called styrenated or vinylated alkyd resins, have been known in the art. However, since for formation of such solutions these modified alkyd resins must be dissolved in organic solvents such, for example, as toluene, xylene and methyl isobutyl ketone, their molecular weights should naturally be limited and also concentrations of the resin solutions are restricted. Accordingly, it has been difficult to obtain solutions having low viscosity and high non-volatile content. Further, films formed from such known organic solvent solutions of modified alkyd resins are insufficient in water resistance, chemical resistance and other properties. Still further, solvents used for formation of such solutions cause photochemical smog, and hence, in view of environmental pollution, amounts used of such solvents must be restricted.

Aqueous emulsions free of an organic solvent, formed by emulsifying synthetic polymers in water, have also been known in the art. In these aqueous emulsions, however, it is difficult to attain low viscosity and high non-volatile content, and films formed from such aqueous dispersions are insufficient in various properties, for example, water resistance, tensile strength, chemical resistance and gloss.

As coating compositions overcoming these defects, there have been proposed non-aqueous polymer dispersions formed by dispersing synthetic polymers stably in an organic liquid such, for example, as mineral spirit and mineral turpentine. Some of methods for formation of such non-aqueous polymer dispersions are illustrated below:

(1) A method comprising polymerizing a monomer dissolved in an organic liquid in the presence of a stabilizer composed of a block- or graft-copolymer formed by polymerizing a compound capable of being solvated with said organic liquid and a small proportion of a monomer capable of forming a polymer which is insoluble in the organic liquid (Japanese patent publications No. 7,047/65, No. 21,154/65 and 342/70). In this method, the resulting polymer is insoluble in the organic liquid.

(2) A method comprising polymerizing a monomer dissolved in an organic liquid in the presence of a stabilizer composed of a graft- or block-copolymer containing a group compatible with the resulting polymer and a group solvated with the organic liquid (Japanese patent publications No. 23,350/65, No. 13,254/67 and No. 16,147/68).

(3) A method comprising polymerizing a monomer in the presence of a graft-polymer stabilizer having a group soluble in an organic liquid and a group which is insoluble in the organic liquid and incompatible with the resulting polymer but capable of being swollen or dissolved in the monomer (Japanese patent publication No. 14,545/70).

(4) A method comprising polymerizing a monomer in the presence of a stabilizer formed by linking a polymer chain solvated with an organic liquid to a non-solvated chain by an ester, ether, amide or urethane linkage and to a vinyl type unsaturated group which is copolymerizable with the monomer (Japanese patent publication No. 19,186/65).

These known methods, however, are defective or insufficient, because it is necessary to purify a polymer precursor used as the stabilizer or to adopt complicated polymerization steps. For instance, in the method (1), a small portion of a monomer is copolymerized with a group solvated with an organic liquid by employing an initiator for block- or graft-polymerization, to form a fine dispersion containing a block- or graft-copolymer. Subsequently, the initiator remaining in the dispersion is destroyed and the remaining monomer is polymerized in the dispersion with use of another initiator which is incapable or hardly capable of initiating the block- or graft-copolymerization. In this method, the polymerization comprises two steps, each employing a different initiator. Accordingly, this method is highly complicated and involves operational difficulties.

The stabilizer is usually used only for dispersing the polymer stably in the organic liquid medium, and thus, the amount of the stabilizer is reduced to the minimum. The stabilizer is generally contained in the polymer dispersion in an amount of from 1 to 10% by weight, at most 25% by weight, of the non-volatile components. In case the amount of the stabilizer is as low as mentioned above, it is possible to obtain a polymer dispersion having a low viscosity but the dispersion is extremely poor in room temperature film-forming property. For this reason, in order to obtain a film from this dispersion, it is necessary to subject it to the baking heat treatment or to plasticize the polymer of the dispersion internally by copolymerizing it with a monomer having a plasticizing activity, to thereby impart a room temperature film-forming property to the dispersion.

Polymer dispersions which are given a room temperature film-forming property by the internal plasticization of synthetic polymers of the dispersions have generally a low viscosity. However, in films formed from such dispersions, since plasticized portions are readily dissolved in dispersion media again, the films are very poor in solvent resistance even against the dispersion media used for formation of the dispersions. Further, when such dispersions are used as paints, brushing cannot be effected smoothly on superimposing coating because the brush feels heavy and cumbersome, and dents are formed in the resulting superimposed coating because of re-dissolution of the undercoating into the organic liquid contained in the upper coating.

Also polymer dispersions containing an oil as a stabilizer have been known in the art. However, films prepared from these dispersions are inferior in chemical properties, especially chemical resistance. Therefore, these dispersions have almost no application to practical use.

Conventional polymer dispersions are obtained by polymerizing vinyl monomers in an organic liquid having no polarity or a very low dissolving power. When an organic liquid having a polarity or a high dissolving power is incorporated in the resulting polymer dispersion, there is a possibility of dissolution, destruction or gelation of the dispersed particles. Therefore, it is impossible to use such conventional polymer dispersions in the form of thermosetting resin solutions by mixing them with a polymer solution containing an organic liquid having a high polarity or a high dissolving power. For instance, it is impossible to obtain a thermosetting resin solution by mixing conventional polymer dispersions with an amino resin solution containing an organic solvent such as xylene or toluene.

SUMMARY OF THE INVENTION

This invention relates to novel polymer dispersions in which the above-mentioned defects of conventional polymer dispersions are overcome or diminished, and to a process for preparation of such polymer dispersions.

A primary object of this invention is to provide a polymer dispersion which can give an excellent film especially when used as a coating composition. More specifically, it is the primary object of this invention to provide a coating composition having a low viscosity and a high volatile content, which can give a fast-drying and air-drying film excellent in chemical resistance and solvent resistance and improved in other properties required of coating films, such, for example, as salt spray resistance, water resistance, weatherability, etc.

In accordance with this invention, there is provided a polymer dispersion which comprises an organic liquid as a dispersion medium and at least one resin component solvated with said organic liquid, said resin component being selected from epoxy ester resins, modified with an unsaturated fatty acid-containing oil, epoxy-modified alkyd resins modified with an unsaturated fatty-acid-containing oil, urethanated oil resins, maleic oil resins, and alkyd resins modified with an unsaturated fatty acid-containing oil, said resin component being block- or graft-copolymerized with a copolymerizable monomer, said organic liquid being capable of dissolving the monomer but incapable of dissolving a polymer formed by polymerization of the monomer, wherein the block- or graft-copolymer of the resin component with the monomer is stably dispersed in the organic liquid.

The "polymer dispersion" referred to in this invention includes, for instance, the following dispersions:

(1) A polymer dispersion comprising an organic liquid as a dispersion medium and an epoxy resin or epoxy-modified alkyd resin modified with an unsaturated fatty acid-containing oil, said resin being solvated with the organic liquid and being block- or graft-copolymerized with a copolymerizable monomer, said organic liquid being capable of dissolving the monomer but incapable of dissolving a polymer formed by polymerization of the monomer, wherein the block- or graft-copolymer of the resin with the monomer is stably dispersed in the organic liquid.

(2) A polymer dispersion set forth in (1) above, wherein the organic liquid has an aromatic hydrocarbon content of less than 12% by weight and an aniline point below 60° C.

(3) a polymer dispersion comprising an organic liquid as a dispersion medium and a urethane resin modified with an unsaturated fatty acid-containing oil (which will be referred to as "urethanated oil resin" hereinbelow), said resin being solvated with the organic liquid and being block- or graft-copolymerized with a copolymerizable monomer, said organic liquid being capable of dissolving the monomer but incapable of dissolving a polymer formed by polymerization of the monomer, wherein the block-or graft-copolymer of the resin with the monomer is stably dispersed in the organic liquid.

(4) A polymer dispersion set forth in (3) above, wherein the organic liquid has an aromatic hydrocarbon content of less than 12% by weight and an aniline point below 60° C.

(5) A polymer dispersion comprising an organic liquid as a dispersion medium and a maleic resin modified with an unsaturated fatty acid-containing oil (which will be referred to as "maleic oil resin" hereinbelow), said resin being solvated with the organic liquid and being block- or graft-copolymerized with a copolymerizable monomer, said organic liquid being capable of dissolving the monomer but incapable of dissolving a polymer formed by polymerization of the monomer, wherein the block- or graft-copolymer of the resin with the monomer is dispersed stably in the organic liquid.

(6) A polymer dispersion set forth in (5) above, wherein the organic liquid has an aromatic hydrocarbon content of less than 12% by weight and an aniline point below 60° C.

(7) A polymer dispersion comprising an organic liquid as a dispersion medium and an alkyd resin modified with an unsaturated fatty acid-containing oil, said resin being solvated with the organic liquid and being block- or graft-copolymerized with a copolymerizable monomer, said organic liquid being capable of dissolving the monomer but incapable of dissolving a polymer formed by polymerization of the monomer, wherein the block- or graft-copolymer of the resin with the monomer is dispersed stably in the organic liquid.

(8) A polymer dispersion set forth in (7) above, wherein the organic liquid has an aromatic hydrocarbon content of less than 12% by weight and an aniline point below 60° C.

In accordance with this invention, there is also provided a process for the preparation of polymer dispersions such as those mentioned above.

BRIEF DESCRIPTION OF THE DRAWINGS

In each of FIGS. 1 and 2, the range indicated by oblique lines is one between the upper and lower limits of the measured viscosity values of the obtained polymer dispersions.

DESCRIPTION OF THE PREFERRED EMBODIMENTS

The organic liquid to be used in this invention, which is capable of dissolving monomers but incapable of polymers formed by polymerization of the monomers, includes organic liquids having no polarity or a relatively low dissolving power, such as aliphatic and aromatic hydrocarbons, e.g., VM & P naphtha, mineral spirit, kerosene, petroleum naphtha and solvent naphtha; aliphatic hydrocarbons, e.g., n-butane, n-hexane, n-heptane, n-octane, isononane, n-decane and n-dodecane; and alicyclic hydrocarbons, e.g. cyclopentane, cyclohexane and cycloheptane. They may be used singly or in the form of admixtures of two or more of them.

In some types of polymerization, it is possible to incorporate small amounts of organic liquids having a high polarity or a high dissolving power into the above-exemplified organic liquids.

In this invention, in order to obtain polymer dispersions having a low viscosity, it is preferred that organic liquids having an aromatic hydrocarbon content of less than 12% by weight and an aniline point below 60° C.

As such preferred organic liquids, there may be mentioned such commercially available products as Naphtha No. 3 (trade name for a product having an aromatic hydrocarbon content of 6% by weight and an aniline point of 58° C. manufactured by Esso Standard Oil Co., Ltd.), Rubber Solvent (trade name for a product having an aromatic hydrocarbon content of 6% by weight and an aniline point of 58° C. manufactured by Esso Standard Oil Co., Ltd.), Heptane (a product having an aromatic hydrocarbon content of 3% by weight and an aniline point of 54° C. manufactured by Esso Standard Oil Co., Ltd.), White Gasoline (trade name for a product having an aromatic hydrocarbon content of 3.9% by weight and an aniline point of 59.4° C. manufactured by Nippon Oil Co., Ltd.), Rubber Gasoline (a product having an aromatic hydrocarbon content of 7% by weight and an aniline point of 46.2° C. manufactured by Nippon Oil Co., Ltd.), Ligroin (a product having an aromatic hydrocarbon content of 10.1% by weight and an aniline point of 43.6° C. manufactured by Nippon Oil Co., Ltd.), Benzine (a product having an aromatic hydrocarbon content of 10.3% by weight and an aniline point of 43.6° C. manufactured by Nippon Oil Co., Ltd.), Gravusol (trade name for a product having an aromatic hydrocarbon content of 10.3% by weight and an aniline point of 43° C. manufactured by Nippon Oil Co., Ltd.), etc. Of course, other organic liquids having an aromatic hydrocarbon content of less than 12% by weight and an aniline point below 60° C. may be used. These organic liquids may be used singly or in the form of admixtures of two or more of them or admixtures with other organic liquids.

In the instant specification, the values of the aromatic hydrocarbon content are those determined by the gas chromatography method and the values of the aniline point are those determined by the method K–2256 of Japanese Industrial Standard.

Unsaturated fatty acid-containing oils to be used preferably in this invention include drying oils and semidrying oils such as linseed oil, tung oil, Chinese tung oil, oiticica oil, perilla oil, dehydrated castor oil, tall oil, soybean oil, safflower oil, cottonseed oil and rice bran oil. In some cases, non-drying oils such as coconut oil, olive oil and castor oil may be used. These oils may be used singly or in the form of admixtures of two or more of them.

The "oil-modified epoxy ester resin" to be used in this invention includes resins having an acid value of 1 to 75, preferably less than 20, and a molecular weight of about 1000 to 3000, which are formed by esterifying an epoxy resin with an oil component such as those mentioned above. The "oil-modified epoxy-modified alkyd resin" to be used in this invention includes resins having an acid value of 1 to 75, preferably less than 20, and a molecular weight of about 1000 to 4000, which are obtained by reacting the above epoxy ester resins with a polyhydric alcohol and a mono- or polybasic acid.

The epoxy resin to be used for formation of the above epoxy ester resin and epoxy-modified alkyd resin includes resins having at least two epoxy groups in the molecule, such as epoxy resins of the bisphenol A-epichlorohydrin condensation type, the halogenated bisphenol type, the resorcine type, the bisphenol F type, the tetrahydroxyphenyl methane type, the novolac type, the polyglycol type and of the glycerine triether type. The weight ratio of such epoxy resin to the oil component is preferably in the range of from 5/95 to 70/30.

As the basic acid to be used for formation of the epoxy-modified alkyd resin, there may be mentioned mono- and poly-basic acids such, for example, as benzoic acid, p-tertbutyl-benzoic acid, phthalic anhydride, maleic anhydride, isophthalic acid, terephthalic acid, tetrachlorophthalic anhydride, HET acid, succinic acid, adipic acid and sebacic acid. As the polyhydric alcohol, there may be exemplified ethylene glycol, propylene glycol, diethylene glycol, butylene glycol, 2,2'-dimethylpropane diol, glycerine, trimethylol ethane, trimethylol propane, 1,2,6-hexane triol, pentaerythritol, sorbitol, diglycerol and dipentaerythritol.

The "maleic oil resin" to be used in this invention includes resins having an acid value of 30 to 200 and a molecular weight of 1000 to 2000, which are formed by addition between an oil component such as one of these mentioned above and maleic anhydride, maleic acid, fumaric acid or a derivative of maleic anhydride. It is preferred that in the above addition reaction the ratio of the acid component to the oil component is within the range of from 5/95 to 20/80.

Specific examples of the maleic oil resin are as follows:

(1) Maleic oil resin formed from linoleic acid and maleic anhydride and expressed by the following formula

(2) Maleic oil resin formed from eleostearic acid and maleic anhydride and expressed by the following formula or

(3) Maleic oil resin formed from oleic acid and maleic anhydride and expressed by the following formula

The "urethanated oil resin" to be used in this invention includes resins having an acid value of 1 to 20 and a molecular weight of about 1000 to 3000, which are formed by the reaction between a diisocyanate and a monoglyceride or diglyceride which is a product formed by the reaction between a polyhydric alcohol and an oil component such as one of those mentioned above. In the urethanated oil resin, it is preferred that the weight ratio of the isocyanate component to the oil component (glyceride) is within the range of from 5/95 to 70/30.

The preparation of a diglyceride and the formation of the urethanated oil resin from, for instance, a diglyceride and a diisocyanate are expressed by the following reaction formulae:

(1) Preparation of diglyceride:

(2) Formation of urethanated oil resin:

(diglyceride)   (diisocyanate)

(urethanized oil resin)

As the diisocyanate compound to be used for formation of the above urethanated oil resin in this invention, there may be mentioned, for instance, ethylene diisocyanate, propylene diisocyanate, tetramethylene diisocyanate, hexamethylene diisocyanate, decamethylene diisocyanate, phenylene diisocyanate, tolylene diisocyanate, naphthylene diisocyanate, 4,4'-methylene-bis(phenyl) isocyanate, 4,4'-methylene-bis(phenyl isocyanate), 3,3'-diisocyanate-1,3-dimethylbenzene, 3,3' - diisocyanate-1,4-dimethylbenzene, 1-methyl-2,4-diisocyanate-cyclohexane, 3,3'-diisocyanate-diethylbenzene, 3,3'-diisocyanate-dimethyltoluene, 3,3'-diisocyanate-diethyltoluene, 3,3' - diisocyanate - dimethylxylene, 3,3'-diisocyaante-diethylxylene, 4,4'-methylene-bis-(cyclohexyl isocyanate), 4,4'-ethylene-bis(cyclohexyl isocyanate), isophoronediamine diisocyanate and lysine diisocyanate. Polyvalent isocyanates formed by addition reaction between an excess of a diisocyanate compound such as mentioned above and a low molecular weight polyol (such as trimethylol propane, ethylene diglycol and the like), and polyvalent isocyanates having a biuret structure may be used in this invention. These isocyanate compounds may be used singly or in the form of admixtures of two or more of them.

As the polyhydric alcohol to be used for formation of the glyceride component, there may be employed, for example, ethylene glycol, propylene glycol, diethylene glycol, butylene glycol, 2,2'-dimethylol propane diol, glycerine, trimethylol ethane, trimethylol propane, 1,2,6-hexane triol, pentaerythritol, sorbitol, diglycerol and dipentaerythritol.

Formation of urethanated oil resins from the above oil, polyhydric alcohol and diisocyanate components may be effected according to known synthesis methods, and commercially available urethanized oil resins may also be used in this invention as they are.

The "oil-modified alkyd resin" to be used in this invention includes products formed by condensation of an oil component such as exemplified above with the following basic acid and polyhydric alcohol components:

(1) a basic acid component selected from (a) saturated polybasic acids such as phthalic anhydride, terephthalic acid, isophthalic acid, tetrachlorophthalic anhydride, tetrahydrophthalic anhydride, succinic acid, adipic acid and sebacic acid, (b) unsaturated polybasic acids such as maleic acid, maleic anhydride, fumaric acid, itaconic acid and citraconic anhydride, (c) polybasic acids obtained by diene-synthesis such as cyclopentadiene-maleic anhydride adduct, terpene-maleic anhydride adduct and rosin-maleic anhydride adduct, and (d) monobasic acids such as benzoic acid and p-tert-butyl-benzoic acid; and (2) a polyhydric alcohol component selected from (a) dihydric alcohols such as ethylene glycol, diethylene glycol, triethylene glycol, propylene glycol, trimethylene glycol and tetramethylene glycol, (b) trihydric alcohols such as glycerine and trimethylol propane, and (c) polyhydric alcohols such as diglycerol, triglycerol, 1,2,6-hexane triol, sorbitol, pentaerythritol, dipentaerythritol and mannitol.

These oil-modified alkyd resins may be prepared by condensing the above oil component, basic acid, component and polyhydric alcohol components by customary methods, and they have a molecular weight of about 500 to 4000, preferably 1000 to 3000, and an acid value of 1 to 75, preferably 1 to 10.

In the preparation of synthetic polymer dispersions these oil-modified epoxy ester resins, oil-modified epoxy modified alkyd resins, urethanized oil resins, maleic oil resins and oil-modified alkyd resins are solvated with organic liquids used as dispersion media and act as stabilizers for dispersing synthetic polymer particles stably in organic liquids.

The stabilizer resin is present in an amount of 25 to 90% by weight, preferably 25 to 70% by weight, of the total solids of the polymer dispersion. In case the amount of the stabilizer resin is less than 25% by weight of the total solids of the polymer dispersion, the intended effects of this invention cannot be attained. Especially when the polymer dispersion is used for air-drying paint, the stabilizer resin acts as a plasticizer for coagulation and adhesion of polymer particles at the time of film formation, and it is hardened by oxidative polymerization after film formation.

Further, in the polymer dispersion of this invention, since the stabilizer resin can be incorporated in a great amount, a good wettability with pigments can be attained. Therefore, even at a high weight concentration of the pigment, a lustrous film can be obtained.

Still further, since the resin component is contained in such a great amount in the polymer particles of the dispersion, the film formed from dispersion can possess an improved chemical resistance.

The above stabilizer resins may be used singly or in the form of admixtures of two or more of them. It is especially preferable to employ admixtures composed of 20 to 80% by weight of an oil-modified alkyd resin and 80 to 20% by weight of other stabilizer resin.

In accordance with this invention, a copolymerizable monomer is block- or graft-polymerized in the presence of the above-mentioned stabilizer resin. By the term "copolymerizable monomer" used in the specification and claims is meant a monomer having at least one chemical structure $>C=C<$ in the molecule and having an ability to form a block- or graft-polymer by reaction with the stabilizer resin. As such monomer, there may be exemplified (a) nitrile type monomers such as acrylonitrile, methacrylonitrile and fumaronitrile; (b) allyl type monomers such as allyl acetate, diallyl acetate, diallyl adipate, allyl chloride, allyl alcohol, 2-chloroallyl acetate, 2-chloroallyl chloride, methallyl acetate and methallyl chloride; (c) ethylene type monomers such as cis-dichloroethylene, transdichloroethylene, tetrachloroethylene and trichloroethylene; (d) unsaturated dibasic acids such as maleic anhydride, diethyl maleate and fumaric acid; (e) unsaturated carboxylic acids such as acrylic acid, methacrylic acid and itaconic acid; (f) acrylic acid esters such as methyl acrylate, ethyl acrylate, n-propyl acrylate, iso-propyl acrylate, n-butyl acrylate, iso-butyl acrylate, tert-butyl acrylate, 2-ethylhexyl acrylate, lauryl acrylate, dodecyl acrylate, stearyl acrylate, cyclohexyl acrylate, dimethylaminoethyl acrylate, diethylaminoethyl acrylate and glycidyl acrylate, (g) methacrylic acid esters such as methyl methacrylate, ethyl methacrylate, n-propyl methacrylate, iso-propyl methacrylate, n-butyl methacrylate, iso-butyl methacrylate, tert-butyl methacrylate, 2-ethylhexyl methacrylate, lauryl methacrylate, dodecyl methacrylate, stearyl methacrylate, cyclohexyl methacrylate, dimethylaminoethyl methacrylate, diethylaminoethyl methacrylate and glycidyl methacrylate; (h) styrene type monomers such as styrene, vinyl toluene and α-methyl styrene; (i) other monomers such as vinyl acetate, vinyl formate, vinyl propionate, vinyl stearate, divinyl benzene, di-isopropenyl benzene, dimethyl itaconate, vinyl chloride and vinylidene chloride; and (j) hydroxyl group-containing unsaturated monomers such as 2-hydroxyethyl acrylate, 2-hydroxypropyl acrylate, 2-hydroxyethyl methacrylate, 2-hydroxypropyl methacrylate and N-methylol acrylamide.

These monomers may be used singly or in the form of admixtures of two or more of them.

When commercially available products of these copolymerizable monomers is used, it is not aways necessary to exclude therefrom polymerization initiators found in commercial products, such as hydroquinone.

In case a combination of two or more of the above copolymerizable monomers is employed, it is preferred that an alkyl ester of acrylc or methacrylic acid having 1 to 3 carbon atoms in the alkyl portion, a vinyl ester monomer having 4 to 7 carbon atoms, or a styrene type monomer is used in an amount greater than 20% by weight of the total monomers.

A radical initiator may be used for the preparation of polymer dispersions. As the radical initiator there may be mentioned, for instance, organic peroxide initiators such as benzoyl peroxide, lauroyl peroxide, cumene hydroperoxide, di-tert-butyl peroxide and acetyl peroxide, and nitrile type initiators such as $\alpha,\alpha'$-azobisisobutyronitrile. The amount of the initiator is 0.01 to 3% by weight, preferably 0.5 to 1% by weight, based on the total monomers.

In carrying out the process of this invention, the reaction temperature is 50–140° C., preferably 70–100° C., and the polymerization time is preferably 1–10 hours. The addition of copolymerizable monomers may be accomplished dividedly in two or more times. It is preferable to introduce nitrogen in a reactor during the polymerization, but introduction of nitrogen is not always necessary. In some special cases, for instance, in case gaseous monomers are used, the reaction may be carried out under pressure.

In the polymer dispersions obtained according to this invention, the average size of the dispersed particles is within a range of from 0.1 to 10μ.

Additives usually use for paint compositions such as organic or inorganic coloring pigments, extenders, dyestuffs, driers, etc. may be incorporated in the polymer dispersion of this invention, if desired.

In case heat curing must be effected for formation of films, a cross-linking component such as a solution of an aminoplast resin, e.g., a melamine resin, may be added, if desired.

Thus, in accordance with this invention, there can be provided polymer dispersions useful especially as coating compositions.

Films excellent in gloss, water resistance, chemical resistance, weatherability, solvent resistance and other properties can be prepared from polymer dispersions of this invention.

In case the polymer dispersion of this invention is used as a coating composition, it may be applied on a substrate such as a plate of a metal, e.g., iron, aluminum, zinc and zinc-plated steel, a plywood, a wooden board, paper, cloth, fabrics and plastics.

This invention will now be described in more detail by referring to examples and comparative examples, where all "parts" and "percentages" are on the weight basis, unless otherwise indicated.

EXAMPLE 1

A reactor equipped with a stirrer, a thermometer, a dropping funnel and a cooling tube was charged with 800 parts of mineral spirit and 400 parts of a linseed oil-modified epoxy ester resin of a solid content of 50%, and the mixture was heated to 80–83° C. under agitation and a nitrogen current was introduced into the reactor. After the temperature of the mixture in the reactor reached 80–83° C., a mixture of 560 parts of methyl methacrylate, 160 parts of ethyl acrylate, 80 parts of acrylonitrile and 4 parts of benzoyl peroxide, which had been prepared in advance and charged in the dropping funnel, was added dropwise to the mixture in the reactor over a period of 2 hours, and the reaction was continued for 8 hours at 80–83° C. A milky white polymer dispersion having a solid content of about 50% and a viscosity of 6000–8000 centipoises as measured at 20° C. was obtained. A film prepared from this polymer dispersion was hard and tough and was excellent in adhesion and flexibility.

The starting epoxy ester resin was prepared by reacting 550 parts of linseed oil fatty acid with 450 parts of an epoxy resin (Epikote No. 1004; trademark for a product manufactured by Shell International Chemicals Corp.) at 240° C. under agitation until the product had an acid value of 10, and then adding 950 parts of mineral spirit into the reaction product. The so formed starting resin had a molecular weight of 2000–2500 and an acid value of 10.

EXAMPLE 2

A mixture composed of 600 parts of mineral spirit, 800 parts of a safflower oil-modified, epoxy-modified alkyd resin having a solid content of 50%, 240 parts of methyl methacrylate, 120 parts of styrene, 240 parts of acrylonitrile and 3 parts of benzoyl peroxide was charged in a reactor equipped with a stirrer, a thermometer and a cooling tube, and the reaction was carried out at 80–83° C. under a nitrogen current for 10 hours to obtain a milky white polymer dispersion having a solid content of about 50% and a viscosity of 10,000–12,000 centipoises as measured at 20° C. A film prepared from this dispersion was hard and excellent in adhesion, chemical resistance, flexibility and gloss.

The starting epoxy-modified alkyd resin was prepared by adding 6160 parts of safflower oil fatty acid to 2700 parts of an epoxy resin (Epikote No. 1001; trade name for a product manufactured by Shell International Chemicals Corp.), reacting them at 205–210° C. until the acid value of the reaction product became 3, adding 1184 parts of phthalic anhydride and 680 parts of pentaerythritol to the reaction product, carrying out the reaction at 230° C., and adding 10,000 parts of mineral spirit to the reaction product when its acid value became 5. The so formed starting resin had a molecular weight of about 2500 to about 3000.

EXAMPLE 3

A mixture composed of 400 parts of mineral spirit, 1200 parts of a soybean oil-modified epoxy ester resin having a solid content of 50%, 280 parts of methyl methacrylate, 80 parts of styrene, 40 parts of acrylonitrile and 2 parts of benzoyl peroxide was reacted in the same manner as in Example 2 to obtain a milky white dispersion having a solid content of about 50% and a viscosity of 1000–1500 centipoises as measured at 20° C. The so formed dispersion (66 parts) was incorporated with 24 parts of titanium oxide and a small quantity of additives, and the admixture was roll-kneaded. The resulting paint gave a film excellent in adhesion, flexibility, chemical resistance and gloss.

The starting epoxy ester resin was one prepared in the same manner as in Example 1 except that soybean oil fatty acid was used as the fatty acid component. The so formed starting resin had a molecular weight of about 2000 to 2500 and an acid value of 10.

EXAMPLE 4

A stainless steel vessel for resin reaction equipped with a stirrer, a thermometer, a dropping funnel and a cooling tube was charged with 90 parts of Epikote No. 1004 (trademark for a epoxy resin manufactured by Shell International Chemicals Corp.), and 110 parts of safflower oil fatty acid, and they were mixed and heated at 240° C. until the reaction product came to have an acid value of less than 10 (for about 5 hours). Subsequently, 400 parts of mineral spirit was added and the temperature was maintained at 85° C. A mixture of 140 parts of methyl methacrylate, 40 parts of styrene, 20 parts of acrylonitrile and 1 part of benzoyl peroxide, which had been prepared and charged in the dropping funnel in advance, was added dropwise to the charge of the reaction vessel over a period of 2 hours, and the reaction was further continued at 85° C. for 8 hours to obtain a milky white dispersion having a solid content of about 50% and a viscosity of S–V as measured at 25° C. according to Gardner-Holdt method.

Comparative Example 1

A mixture of 200 parts of a soybean oil-modified epoxy ester resin having a solid content of 50% (same as the resin used in Example 3), 170 parts of mineral spirit and 30 parts of xylol was heated at 80–85° C. under agitation, and a mixture of 20 parts of acrylonitrile, 140 parts of methyl methacrylate, 40 parts of styrene and 2 parts of benzoyl peroxide was added dropwise to the above mixture over a period of 3 hours. After the resulting mixture had been maintained at 80–85° C. for 5 hours, 200 parts of butyl methacrylate and 2 parts of benzoyl peroxide were added to the mixture. After the reaction had been further continued for 5 hours, 4 parts of azobisisobutyronitrile was added to the reaction mixture and the reaction was further conducted for 4 hours. Then, 170 parts of mineral spirit and 30 parts of xylol were added to the reaction mixture to obtain a polymer dispersion having a non-volatile content of 49.5% and a viscosity of U as measured at 20° C. according to Gardner-Holdt method.

With use of polymer dispersions obtained in Examples 1 and 4 and Comparative Example 1, films were prepared in the following manner. Namely, 75 parts of the dispersion was incorporated with 25 parts of titanium oxide of the rutile type and a small quantity of additives, and the mixture was roll-kneaded to obtain a paint. A brush was used to coat a metal plate with the paint so that the film thickness would be 30μ, and it was air-dried for 24 hours. The resulting films were subjected to the following tests:

(a) alkali resistance test: dipped for 24 hours in 3% NaOH aqueous solution
(b) acid resistance test: dipped for 2 months in 5% $H_2SO_4$ aqueous solution
(c) water resistance test: dipped for 1 month in water
(d) saline resistance test: dipped for 3 months in 3% NaCl aqueous solution
(e) salt spray resistance test: 3% NaCl aqueous solution sprayed for 2000 hours
(f) moisture resistance test: allowed to stand at 50° C. and more than 97% relative humidity for 1000 hours
(g) weatherability test: outdoor exposure for 6 months
(h) abrasion resistance test: falling sand abrasion test
(i) impact resistance test: ½", 500 g., 50 cm.
(j) solvent resistance test: xylol swellability Results of these tests made on the films are shown in Table 1.

TABLE 1

|  | Film of Example 1 | Film of Example 4 | Film of Comparative Example 1 |
|---|---|---|---|
| Alkali resistance (a) | ⊙ | ⊙ | O |
| Acid resistance (b) | ⊙ | ⊙ | O |
| Water resistance (c) | O | O | △ |
| Saline resistance (d) | ⊙ | ⊙ | △ |
| Salt spray resistance (e) | ⊙ | ⊙ | △ |
| Moisture resistance (f) | ⊙ | ⊙ | △ |
| Weatherability (g) | ⊙ | ⊙ | ⊙ |
| Abrasion resistance (h) | ⊙ | ⊙ | O |
| Impact resistance (i) | ⊙ | O | O |
| Solvent resistance (j) | O | O | X |

NOTE.—⊙ = Very good; O = Ordinary; △ = Slightly bad; X = Bad.

One coat of each of the above three paints was applied to a metal plate by a brush, and when coated film became no longer tacky, the brush coating was conducted once again to test the workability of the paint.

In the case of the paint obtained in Comparative Example 1, the undercoating was dissolved in mineral spirit contained in the upper coating paint, and hence, the brush-coating workability was very poor. In contrast, in the case of paints obtained in Examples 1 and 4, the above defect was not observed because the paints were excellent in solvent resistance.

EXAMPLE 5

A stainless steel vessel for resin reaction equipped with a stirrer, a thermometer, a dropping funnel and a cooling tube was charged with 40 parts of Epikote No. 1004 (the same resin as used in Example 4), 120 parts of soybean oil fatty acid, 30 parts of pentaerythritol and 5 parts of xylene, and the mixture was heated at 220–225° C. under agitation while blowing in an inert gas and reacted for 60 minutes. The acid value of the reaction product was 45. Then, the temperature was lowered to 180° C. and 50 parts of phthalic anhydride was added to the above reaction product. The mixture was reacted at 230–240° C. and when the acid value of the reaction product was less than 10, the temperature was lowered and 480 parts of mineral spirit was added. While the mixture was maintained at 85° C., a mixture composed of 168 parts of methyl methacrylate, 48 parts of styrene, 24 parts of acrylonitrile and 1.2 parts of benzoyl peroxide, which had been prepared and charged in the dropping funnel in advance, was added dropwise to the above mixture over a period of about 2 hours, and the reaction was carried out at 85° C. for 8 hours to obtain a milky white dispersion having a solid content of about 50% and a viscosity of X–Y as measured at 25° C. according to Gardner-Holdt method.

EXAMPLE 6

A reactor equipped with a stirrer, a thermometer, a dropping funnel and a cooling tube was charged with 800 parts of mineral spirit and 400 parts of linseed oil-modified urethanated oil having a solid content of 50%, and the mixture was heated to 80–83° C. and a nitrogen current was introduced thereinto. When the temperature reached 80–83° C., a mixture composed of 560 parts of methyl methacrylate, 160 parts of ethyl acrylate, 80 parts of acrylonitrile and 4 parts of benzoyl peroxide, which had been prepared and charged in the dropping funnel in advance, was added dropwise to the mixture in the reactor over a period of 2 hours. The reaction was continued for 8 hours at 80–83° C. to obtain a milky white dispersion having a solid content of about 50% and a viscosity of X–Y as measured at 25° C. according to Gardner-Holdt method. A film formed from this dispersion was hard and tough, and was excellent in flexibility.

The starting linseed oil-modified urethanated oil was prepared in the following manner. Namely, 2000 parts of linseed oil was heated at 150° C. under agitation and 890 parts of pentaerythritol was added thereto, following which the temperature was raised to 220° Then, 1.5 parts of calcium oxide was added to the reaction mixture, and the temperature was maintained at 245° C. until the reaction was so advanced that 1 part of the reaction product could be dissolved in 2 parts of ethanol. Then, 2400 parts of mineral spirit was added to the reaction mixture, and finally, a mixture of 1900 parts of tolylene diisocyanate, 2400 parts of mineral spirit and 6 parts of a lead naphthenate (14% concentration) was added to the mixture following which the reaction was carried out at 75–80° C. for 2 hours. The so formed starting resin had a molecular weight of 2500 to 3000.

EXAMPLE 7

A reactor equipped with a stirrer, a thermometer and a cooling tube was charged with a mixture of 600 parts of mineral spirit, 800 parts of a safflower oil-modified urethanated oil having a solid content of 50%, 240 parts of methyl methacrylate, 120 parts of styrene, 240 parts of acrylonitrile and 3 parts of benzoyl peroxide, and the mixture was reacted at 80–83° C. for 10 hours under a nitrogen current to obtain a milky white dispersion having a solid content of about 50% and a viscosity of W as measured at 25° C. according to Gardner-Holdt method.

A film prepared from this dispersion was hard and excellent in flexibility and gloss.

The starting safflower oil-modified urethanated oil was prepared in the same manner as in Example 6 except that 2000 parts of safflower oil was used instead of linseed oil used in Example 6. The so formed starting resin had a molecular weight of 2600–3000.

EXAMPLE 8

A reactor equipped with a stirrer, a thermometer and a cooling tube was charged with a mixture of 400 parts of mineral spirit, 1200 parts of a soybean oil-modified urethanated oil having a solid content of 50%, 280 parts of methyl methacrylate, 80 parts of styrene, 40 parts of acrylonitrile and 2 parts of benzoyl peroxide, and the mixture was reacted at 80–83° C. in a nitrogen atmosphere for 10 hours to obtain a milky white dispersion having a solid content of about 50% and a viscosity of Y as measured at 25° C, according to Gardner-Holdt method. The so formed dispersion (66 parts) was incorporated with 24 parts of titanium oxide and a small quantity of additives, and the admixture was roll-kneaded. The resulting paint gave a hard film excellent in flexibility and gloss.

The starting soybean oil-modified urethanated oil was prepared in the same manner as in Example 6 except that 2000 parts of soybean oil was used instead of linseed oil used in Example 6. The so formed starting urethanated resin had a molecular weight of about 2500 to 3000.

EXAMPLE 9

A stainless steel vessel for resin reaction equipped with a stirrer, a thermometer, a dropping funnel, a cooling tube and a water separator was charged with 40 parts of soybean oil, and it was heated at 150° C. Then, 17.8 parts of pentaerythritol was added and the temperature was raised to 220° C., following which 0.03 part of calcium oxide was added and the temperature was raised to 245° C. The mixture was maintained at this temperature until the reaction was so advanced that 1 part of the reaction product sample could be dissolved in 2 parts of ethanol, while conducting the sampling several times during the reaction. Then, the reaction mixture was heated at 245° C. for 1 hour, and 50 parts of mineral spirit was added thereto, following which the reaction mixture was cooled to 50° C. Then, a mixture of 38 parts of tolylene diisocyanate, 50 parts of mineral spirit and 0.12 part of a 1-4% lead naphthenate solution was added to the reaction mixture, and the reaction was carried out for 2 hours at 75–80° C., following which 100 parts of mineral spirit was added to the reaction mixture and the temperature was raised to 85° C. to effect the reaction and obtain a urethanated oil resin having a molecular weight of about 2500 to 2900. Then, a mixture composed of 70 parts of methyl methacrylate, 20 parts of styrene, 10 parts of acrylonitrile and 0.5 part of benzoyl peroxide, which had been prepared and charged in the dropping funnel in advance, was added dropwise to the so formed urethanated oil resin over a period of 1 to 2 hours, and the reaction was carried out at 85° C. for 8–10 hours to obtain a milky white dispersion having a solid content of about 50% and a viscosity of U–V as measured at 25° C. according to Gardner-Holdt method.

Comparative Example 2

A mixture of 3420 parts of soybean oil and 240 parts of pentaerythritol was heated at 230° C. under agitation, and 4 parts of sodium formate was added thereto. Then, the temperature was raised to 260° C. and 715 parts of pentaerythritol was further added to the mixture. The reaction was carried out to such an extent that 1 part of the reaction product sample could be dissolved in 2 parts of methanol. Then, 680 parts of soybean oil fatty acid was added to the reaction mixture, and after the temperature was lowered to 180° C, 1524 parts of phthalic anhydride was added to the mixture. Then, the temperature was raised to 230° C. and the reaction was conducted until the acid value of the reaction product became less than 5, following which 2800 parts of mineral spirit was added and the mixture was cooled to obtain a soybean oil-modified alkyd resin having a molecular weight of about 3000 to 3500 and a solid content of 70%.

200 parts of the so formed soybean oil-modified alkyd resin solution having a solid content of 70% and 1400 parts of mineral spirit were charged into a reaction vessel and the mixture was maintained at 85° C. A mixture composed of 490 parts of methyl methacrylate, 140 parts of styrene, 70 parts of acrylonitrile and 3.5 parts of benzoyl peroxide, which had been prepared and charged into a dropping funnel of the reaction vessel, was added dropwise to the mixture in the reaction vessel, and the reaction was conducted for 8 hours at 85° C. to obtain a milky white dispersion having a solid content of about 50% and a viscosity of V–W as measured at 25° C. according to Gardner-Holdt method.

Films were prepared from dispersions obtained in Examples 8 and 9 and Comparative Example 2 in the following manner. Namely, 75 parts of the dispersion was incorporated with 25 parts of titanium oxide of the rutile type and a small quantity of additives, an the admixture was roll-kneaded to obtain a paint. The resulting paint was coated by a brush on a metal plate so that the film thickness would be 30μ, and was air-dried for 24 hours. The resulting films were subjected to the same tests as described in Comparative Example 1. Results are shown in Table 2.

TABLE 2

|  | Film of Example 8 | Film of Example 9 | Film of Comparative Example 2 |
| --- | --- | --- | --- |
| Alkali resistance | ⊙ | ⊙ | X |
| Acid resistance | ⊙ | ⊙ | △ |
| Water resistance | O | O | △ |
| Saline resistance | ⊙ | ⊙ | △ |
| Salt spray resistance | ⊙ | ⊙ | △ |
| Moisture resistance | ⊙ | ⊙ | ⊙ |
| Weatherability | ⊙ | ⊙ | ⊙ |
| Abrasion resistance | ⊙ | ⊙ | O |
| Impact resistance | O | O | O |
| Solvent resistance | O | O | △ |

NOTE.—⊙=Very good; O=Ordinary; △=Slightly bad; X=Bad.

EXAMPLE 10

In a stainless steel vessel for resin reaction equipped with a stirrer, a thermometer, a dropping funnel, a cooling tube and a water separator, 80 parts of safflower oil was heated to 150° C. under agitation and 32 parts of glycerine was added thereto, following which the temperature was raised to 220° C. and 0.06 part of calcium oxide was added. Then, the temperature of the mixture was raised to 245° C. and the mixture was maintained at this temperature until 1 part of the mixture sample could be dissolved in 2 parts of ethanol. Then, the mixture was heated at 245° C. for another one hour and 100 parts of mineral spirit was added thereto, following which the temperature was lowered to 50° C. Then, a mixture of 76 parts of tolylene diisocyanate, 100 parts of mineral spirit and 0.24 part of a 14% lead naphthenate solution was added to the mixture in the reaction vessel, and the resulting mixture was heated at 75–80° C. for 2 hours, following which 25 parts of mineral spirit was further added and the temperature was raised to 85° C. to effect the reaction and obtain a urethanated oil resin having a molecular weight of 2500–3000. A mixture composed of 50 parts of methyl methacrylate, 20 parts of styrene, 30 parts of acrylonitrile, and 0.5 part of benzoyl peroxide, which had been prepared in advance and charged in the dropping funnel of the reaction vessel, was added dropwise to the so formed urethanated oil resin over a period of 1 to 2 hours, and the reaction was conducted at 85° C. for 8–10 hours to obtain a milky white dispersion having a solid content of about 50% and a viscosity of Q–R as measured at 25° C. according to Gardner-Holdt method.

EXAMPLE 11

170 parts of linseed oil was charged in a reactor equipped with a stirrer, a thermometer, a dropping funnel and a cooling tube, and nitrogen was introduced into the reactor and the temperature was raised to 150° C. Then, 30 parts of maleic anhydride was charged into the reactor and the temperature was raised to 250° C. Thus, the reaction was carried out for 5 hours under agitation, following which 1000 parts of mineral spirit was added to the reaction mixture under cooling and the reaction was effected at 80–83° C. to obtain a maleic oil resin having a molecular weight of 1550 and an acid value of 120. A mixture composed of 560 parts of methyl methacrylate, 160 parts of ethyl acrylate, 80 parts of acrylonitrile and 4 parts of benzoyl peroxide, which had been prepared in advance and charged in the dropping funnel, was added dropwise to the so formed maleic oil resin over a period of 2 hours, and the reaction was conducted at 80–83° C. for 8 hours to obtain a milky white dispersion having a solid content of about 50% and a viscosity of Y as measured at 25° C. according to Gardner-Holdt method. A film prepared from this dispersion was hard and tough, and was excellent in adhesion and flexibility.

EXAMPLE 12

In the same reactor as used in Example 11, 360 parts of dehydrated castor oil was charged, and nitrogen was introduced into the reactor and the temperature was raised to 150° C. Then, 40 parts of maleic anhydride was added to the reactor, and the temperature was raised to 250° C. Under agitation, the reaction between the oil and acid anhydride was effected for 5 hours to obtain a maleic oil resin having a molecular weight of 1300 and an acid value of 70. Under cooling 1000 parts of mineral spirit was added to the maleic oil resin, and the mixture was maintained at 180–83° C. A mixture composed of 240 parts of methyl methacrylate, 120 parts of styrene, 240 parts of acrylonitrile and 3 parts of benzoyl peroxide, which had been prepared in advance and charged in the dropping funnel, was added dropwise to the above maleic oil resin over a period of 1 hour and the reaction was carried out at 80–83° C. for 10 hours to obtain a milky white dispersion having a solid content of 50% and a viscosity of V as measured at 25° C. according to Gardner-Holdt method. A film prepared from this dispersion was hard, and was excellent in flexibility and gloss.

EXAMPLE 13

3420 parts of soybean oil and 240 parts of pentaerythritol were heated at 230° C. under agitation, and 4 parts of sodium formate was added thereto, following which the temperature was raised to 260° C. and 715 parts of pentaerythritol was added to the mixture to further conduct the reaction until 1 part of the reaction product sample could be dissolved in 2 parts of methanol. Then, 680 parts of soybean oil fatty acid was added to the reaction mixture, and the temperature was lowered to 180° C. and 1524 parts of phthalic anhydride was added. Then, the temperature was raised again to 230° C. and the reaction was continued until the acid value of the reaction product was less than 5, following which 2800 parts of mineral spirit was added and the temperature was lowered. Thus was obtained a soybean oil-modified alkyd resin having a molecular weight of about 3000 to 3500.

700 parts of the so formed soybean oil-modified alkyd resin and 1400 parts of mineral spirit were charged into the same reaction vessel as used in Example 11, and they were maintained at 85° C. A mixture composed of 490 parts of methyl methacrylate, 140 parts of styrene, 70 parts of acrylonitrile and 3.5 parts of benzoyl peroxide, which had been prepared in advance and charged in the dropping funnel of the reaction vessel, was added dropwise to the above mixture over a period of 2 hours, and the reaction was carried out at 85° C. for 8 hours to obtain a milky white dispersion having a solid content of about 50% and a viscosity of V–W as measured at 25° C. according to Gardner-Holdt method.

EXAMPLE 14

A mixture composed of 1100 parts of Naphtha No. 3 (trademark for a product having an anilin point of 58° C. and an aromatic hydrocarbon content of 6% manufactured by Esso Standard Oil Co., Ltd.), 1000 parts of a soybean oil-modified alkyd resin solution (phthalic anhydride content=24%; oil length=65; acid value less than 5), which was prepared in the same manner as in Example 13 except that Naphtha No. 3 was used as the solvent instead of mineral spirit, 70 parts of acrylonitrile and 1.4 parts of benzoyl peroxide, was reacted at 80° C. for 1 hour under agitation in a nitrogen gas current in a reactor equipped with a stirrer, a thermometer and a cooling tube. A mixture composed of 490 parts of methyl methacrylate, 140 parts of styrene and 7 parts of benzoyl peroxide, which had been prepared in advance, was added dropwise to the above reaction mixture at 80° C. under agitation over a period of about 2 hours. Then, the reaction was further conducted at 80–83° C. for 5 hours to obtain a low viscosity polymer dispersion having a solid content of 50% and a viscosity of B (0.65 poise) as measured at 25° C. according to Gardner-Holdt method.

EXAMPLE 15

5345 parts of safflower oil fatty acid was added to 2700 parts of the same expoxy resin as used in Example 2, and they were reacted at 205–210° C. until the acid value of the product became 3. Then, 1184 parts of phthalic anhydride and 680 parts of pentaerythritol were added to the above reaction product, and the reaction was further continued at 230° C. When the acid value of the reaction product was 5, the reaction mixture was cooled and 9421 parts of Rubber Solvent (trade name for a product having an aniline point of 58° C. and an aromatic hydrocarbon content of 6% manufactured by Esso Standard Oil Co., Ltd.) was added to the reaction mixture to obtain a solution of a safflower-modified epoxy-modified alkyd resin having a molecular weight of 2500–3000.

A mixture of 800 parts of the so formed safflower-modified epoxy-modified alkyd resin having a solid content of 50% and an oil length of 59 with 600 parts of Rubber Solvent, 240 parts of methyl methacrylate, 120 parts of ethyl acrylate, 240 parts of acrylonitrile and 3 parts of benzoyl peroxide was reacted at 80–83° C. in a nitrogen gas current for 10 hours in a reaction vessel equipped with a stirrer, a thermometer and a cooling tube, to obtain a low viscosity polymer dispersion having a solid content of 50% and a viscosity of D (1.0 poise) as measured at 25° C. according to Gardner-Holdt method.

EXAMPLE 16

2000 parts of soybean oil was heated at 150° C. under agitation, and 890 parts of pentaerythritol was added thereto and the temperature was raised to 220° C. Then, 1.5 parts of calcium oxide was added to the mixture and the temperature was further elevated to 245° C. The mixture was maintained at this temperature until 1 part of the mixture sample could be dissolved in 2 parts of ethanol. Then, the mixture was further heated at 245° C. for one hour and then cooled, following which 2400 parts of Heptane was added to the mixture and the temperature was lowered to 50° C. Then, 1900 parts of tolylene diisocyanate, 2400 parts of Heptane and 6 parts of a 14% lead naphthenate solution were added to the above mixture, and the resulting mixture was heated at 75–80° C. for 2 hours to obtain a soybean oil-modified urethanated oil resin haivng a molecular weight of 2500–3000.

A mixture of 1200 parts of the so formed soybean oil-modified urethanated oil resin (50% Heptane solution)

with 400 parts of Heptane (having an aniline point of 54° C. and an aromatic hydrocarbon content of 3%), 280 parts of methyl methacrylate, 80 parts of styrene, 40 parts of acrylonitrile and 2 parts of benzoyl peroxide was charged in a reaction vessel and reacted at 80–83° C. for 10 hours under agitation to obtain a low viscosity polymer dispersion having a solid content of 50% and a viscosity of C (0.85 poise) as measured at 25° C. according to Gardner-Holdt method.

EXAMPLE 17

170 parts of linseed oil was charged in a reaction vessel equipped with a stirrer, a thermometer, a dropping funnel and a cooling tube, and was heated at 150° C. in a nitrogen gas current. Then, 30 parts of maleic anhydride was added and the temperature was raised to 250° C. The reaction was carried out at this temperature for 5 hours under agitation. While the reaction mixture was being cooled, 1000 parts of Rubber Gasoline (aniline point=46.2° C.; an aromatic hydrocarbon content=7%) was added to the reaction mixture. The resulting mixture was maintained at 80–83° C. to obtain a maleic oil resin having a molecular weight of 1600 and an acid value of 120. Then, a mixture composed of 560 parts of methyl methacrylate, 160 parts of ethyl acrylate, 80 parts of acrylonitrile and 4 parts of benzoyl peroxide, which had been prepared in advance and charged in the dropping funnel, was added dropwise to the maleic oil resin over a period of 2 hours, and the reaction was carried out at 80–83° C. for 8 hours to obtain a low viscosity polymer dispersion having a solid content of 50% and a viscosity of B–C (0.65–0.85 poise) as measured at 25° C. according to Gardner-Holdt method.

EXAMPLE 18

In the same manner as in Example 13, nine polymer dispersions a, b, c, g, h, i, j, k and l were prepared from from 50 parts, reckoned as solids, of a soybean oil-modified alkyd resin (oil length=50; phthalic anhydride content=32%; viscosity=2.5 stokes poise (as measured at 25° C. on 60% solution in xylol)), 25 parts of methyl methacrylate, 20 parts of styrene, 5 parts of acrylonitrile and 100 parts of an organic liquid indicated below (the symbol prefixed to the organic liquid corresponds to the symbol of the polymer dispersion).

a: Naphtha No. 3 (aromatic hydrocarbon content=6%; aniline point=58° C.; trade name for the product of Esso Standard Oil Co., Ltd.)
b: Rubber Gasoline (aromatic hydrocarbon content =7%; aniline point=46° C.; product of Nippon Oil Co., Ltd.)
c: Rubber Gasoline (aromatic hydrocarbon content =12%; aniline point=43° C.; product of Nippon Oil Co., Ltd.)
g: Ligroin (aromatic hydrocarbon content=10.1%; aniline point=38.8° C.; product of Nippon Oil Co., Ltd.)
h: Gravusol (aromatic hydrocarbon content=10.3%; aniline point=43° C.; trade name for the product of Nippon Oil Co., Ltd.)
i: Rubber Gasoline (aromatic hydrocarbon content =7.0%; aniline point=46° C.; product of Nippon Oil Co., Ltd.)
j: Heptane (aromatic hydrocarbon content=3.0%; aniline point=54° C.; product of Esso Standard Oil Co., Ltd.)
k: Naphtha No. 3 (aromatic hydrocarbon content= 6.0%; aniline point=58° C.)
l: White Gasoline (aromatic hydrocarbon content=3.9%; aniline point=59° C.; trade name for the product of Nippon Oil Co., Ltd.)

Figure 1:
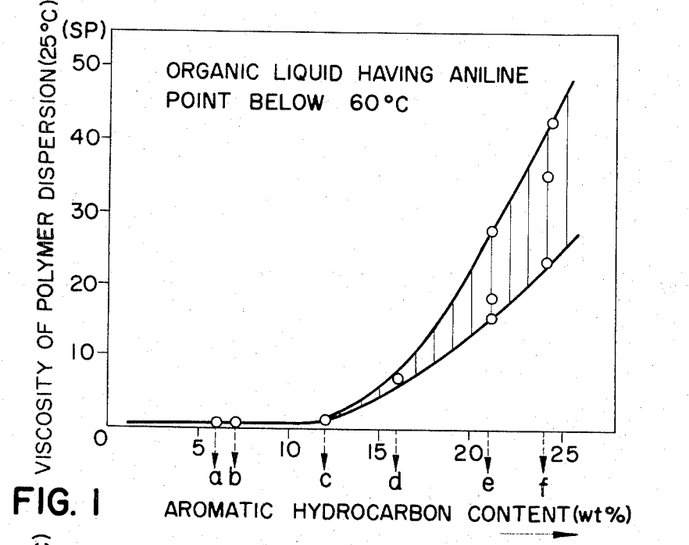
FIG. 1 illustrates the relation between the aromatic hydrocarbon content (percent by weight) of the organic liquid and the viscosity (stokes poise) of the polymer dispersion in embodiments where various organic liquids having an aniline point below 60° C. were used.
Figure 2:
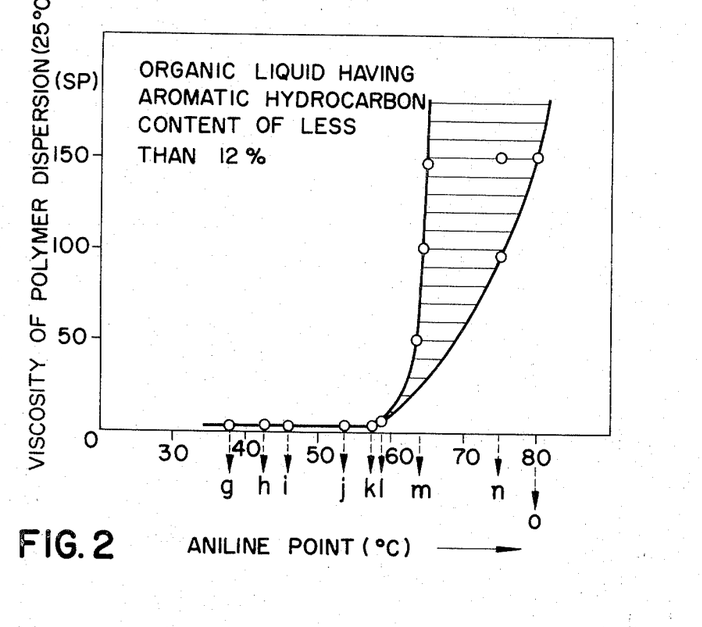
FIG. 2 illustrates the relation between the aniline point of the organic liquid and the viscosity (stokes poise) of the polymer dispersion in embodiments where various organic liquids having an aromatic hydrocarbon content of less than 12% by weight were used.

With respect to each of the so formed 9 polymer dispersions, the viscosity (stokes poise) was measured at 25° C., and results are shown in FIGS. 1 and 2.

As is apparent from FIGS. 1 and 2, polymer dispersions of a very low viscosity could be obtained by employing organic liquids having an aromatic hydrocarbon content of less than 12% by weight and an aniline point below 60° C.

Comparative Example 3

Polymer dispersions d, e, f, m, n, and o were prepared from the same mixture as used in Example 18 except that an organic liquid indicated below was used.

d: Rubber Gasoline (aromatic hydrocarbon content=16%; aniline point=38° C.; product of Nippon Oil Co., Ltd.)
e: A-Sol (aromatic hydrocarbon content=21%; aniline point=46° C.; trade name for the product of Nippon Oil Co., Ltd.)
f: Mineral Spirit A (aromatic hydrocarbon content=24%; aniline point=44° C.; trade name for the product of Nippon Oil Co., Ltd.)
m: Drysol (aromatic hydrocarbon content=6.2%; aniline point=64° C.; trade name for the product of Nippon Oil Co., Ltd.)
n: Isopar E (aromatic hydrocarbon content=0.05%; aniline point=75° C.; trade name for the product of Esso Standard Oil Co., Ltd.)
o: Isopar G (aromatic hydrocarbon content=0.24%; aniline point=80° C.; trade name for the product of Esso Standard Oil Co., Ltd.)

With respect to each of these polymer dispersions, the viscosity was measured in the same manner as in Example 18. Results are shown in FIGS. 1 and 2.

EXAMPLE 19

1000 parts of a soybean oil fatty acid-modified epoxy ester resin having a solid content of 50% (the same resin as employed in Example 3), 715 parts of a soybean oil-modified alkyd resin having a solid content of 70% (the same resin as used in Example 14) and 1286 parts of Naphtha No. 3 were mixed and heated at 80–85° C. A mixture of 700 parts of methyl methacrylate, 200 parts of styrene, 100 parts of acrylonitrile and 10 parts of benzoyl peroxide was gradually added dropwise to the above mixture over a period of 2 hours, and the reaction was carried out at 80–85° C. under agitation for 10 hours to obtain a polymer dispersion having a viscosity of E (1.25 poises) as measured at 25° C. according to Gardner-Holdt method.

What we claim is:

1. A synthetic polymer dispersion which comprises an organic liquid dispersion medium and an alkyd resin modified with an unsaturated fatty acid-containing oil, said oil-modified alkyd resin being solvated with said organic liquid dispersion medium and being block- or graft-copolymerized with a copolymerizable monomer having at least one site of ethylenic unsaturation, said organic liquid being capable of dissolving the monomer but incapable of dissolving a polymer formed by polymerization of the monomer, whereby the block- or graft-copolymer of said oil-modified alkyd resin with the copolymerizable monomer is stably dispersed in the organic liquid dispersion medium and the amount of the oil-modified alkyd resin is 25 to 90% by weight of the total solids of the polymer dispersion.

2. The synthetic polymer dispersion set forth in claim 1, wherein the organic liquid has an aniline point below 60° C. and an aromatic hydrocarbon content of less than 12% by weight.

3. The synthetic polymer dispersion set forth in claim 1, wherein the resin mixture consists essentially of 20 to 80% by weight of said oil-modified alkyd resin and 80% to 20% by weight of at least one resin selected from the group consisting of oil-modified epoxy ester resin having an acid value of 1 to 75 and a molecular weight of about 1000 to about 3000, formed by esterifying an epoxy resin with an unsaturated fatty acid-containing oil; oil-modified epoxy-modified alkyd resins having an acid value of 1 to 75 and a molecular weight of about 1000 to about 4000, obtained by reacting the epoxy ester resin with a polyhydric alcohol and a mono- or poly-basic acid; urethanated oil resins having an acid value of 1 to 20 and a molecular weight of about 1000 to about 3000, formed by reaction between a diisocyanate and a mono- or diglyceride; and maleic oil resins having an acid value of 30 to 200 and a molecular weight of about 1000 to about 2000, formed by addition of an unsaturated fatty acid-containing oil and a compound selected from the group consisting of maleic anhydride, maleic acid, fumaric acid, and a derivative of maleic anhydride; said resin mixture being solvated with the organic liquid dispersion medium.

4. A process for the preparation of polymer dispersions which comprises block- or graft-copolymerizing, for between 1–10 hours at a temperature between 50° C. and 140° C., a copolymerizable monomer having at least one site of ethylenic unsaturation in the presence of an alkyd resin modified with an unsaturated fatty acid-containing oil, said oil-modified alkyd resin being solvated with an organic liquid dispersion medium capable of dissolving said copolymerizable monomer but incapable of dissolving a polymer formed by polymerization of the monomer, so that the amount of said oil-modified alkyd resin is 25 to 90% by weight of the total solids of the resulting polymer dispersion.

5. A synthetic polymer dispersion, which comprises an organic liquid dispersion medium which is capable of dissolving monomers but incapable of dissolving a polymer formed by polymerization of the monomers; and at least one resin component solvated with the organic liquid dispersion medium and selected from the group consisting of (a) oil-modified epoxy ester resins having an acid value of 1 to 75 and a molecular weight of about 1000 to about 3000, formed by esterifying an epoxy resin with an unsaturated fatty acid-containing oil and (b) oil-modified epoxy-modified alkyd resins having an acid value of 1 to 75 and a molecular weight of about 1000 to about 4000, obtained by reacting an epoxy ester resin with a polyhydric alcohol and a mono- or poly-basic acid; said resin component being block- or graft-copolymerized with a copolymerizable monomer having at least one site of ethylenic unsaturation, whereby the block- or graft-copolymer of said oil-modified epoxy ester resin or said oil-modified epoxy-modified alkyd resin with the monomer is stably dispersed in the organic liquid dispersion medium and the amount of the resin component is 25 to 90% by weight of the total solids of the polymer dispersion.

6. The synthetic polymer dispersion set forth in claim 5, wherein the organic liquid has an aniline point below 60° C. and an aromatic hydrocarbon content of less than 12% by weight.

7. The synthetic polymer dispersion set forth in claim 5, wherein in the oil-modified epoxy ester resin or epoxy-modified alkyd resin, the weight ratio of the oil component/resin component is from 30/70 to 95/5.

8. A process for the preparation of polymer dispersions, which comprises block- or graft-copolymerizing, for between 1–10 hours at a temperature between 50° C. and 140° C., a copolymerizable monomer having at least one site of ethylenic unsaturation in the presence of an ester resin selected from the group consisting of (a) oil-modified epoxy ester resins having an acid value of 1 to 75 and a molecular weight of about 1000 to about 3000 formed by esterifying an epoxy resin with an unsaturated fatty acid-containing oil and (b) oil-modified epoxy-modified alkyd resins having an acid value of 1 to 75 and a molecular weight of about 1000 to about 4000, obtained by reacting an epoxy ester resin with a polyhydric alcohol and a mono- or poly-basic acid; said ester resin being solvated with an organic liquid dispersion medium capable of dissolving the monomer but incapable of dissolving a polymer formed by polymerization of the monomer, so that the amount of the ester resin is 25 to 90% by weight of the total solids of the resulting polymer dispersion.

9. A synthetic polymer dispersion, which comprises an organic liquid dispersion medium which is capable of dissolving monomers but incapable of dissolving a polymer formed by polymerization of the monomers; and a urethanated oil resin having an acid value of 1 to 20 and a molecular weight of about 1000 to about 3000, formed by reaction between a diisocyanate and a mono or diglyceride; said urethanated oil resin being solvated with the organic liquid dispersion medium and being block- or graft-copolymerized with a copolymerizable monomer having at least one site of ethylenic unsaturation, whereby the block- or graftcopolymer of said urethanated oil resin with said copolymerizable monomer is stably dispersed in said organic liquid dispersion medium and the amount of the urethanated oil resin is 25 to 90% by weight of the total solids of the polymer dispersion.

10. The synthetic polymer dispersion set forth in claim 9, wherein the organic liquid has an aniline point below 60° C. and an aromatic hydrocarbon content of less than 12% by weight.

11. The synthetic polymer dispersion set forth in claim 9, wherein in the urethanated oil resin the weight ratio of the oil component (glyceride)/isocyanate component is from 30/70 to 95/5.

12. A process for the preparation of polymer dispersions, which comprises block- or graft-copolymerizing, for between 1–10 hours at a temperature between 50° C. and 140° C., a copolymerizable monomer having at least one site of ethylenic unsaturation in the presence of a urethanated oil resin having an acid value of 1 to 20 and a molecular weight of about 1000 to about 3000, formed by reaction between a diisocyanate and a mono- or di-glyceride, said urethanated oil resin being solvated with an organic liquid dispersion medium capable of dissolving the monomer but incapable of dissolving a polymer formed by polymerization of the monomer, so that the amount of the urethanated oil resin is 25 to 90% by weight of the total solids of the resulting polymer dispersion.

13. A synthetic polymer dispersion, which comprises an organic liquid dispersion medium which is capable of dissolving monomers but incapable of dissolving a polymer formed by polymerization of the monomers; and a maleic oil resin having an acid value of 30 to 200 and a molecular weight of about 1000 to about 2000, formed by addition of an unsaturated fatty acid-containing oil and a compound selected from the group consisting of maleic anhydride, maleic acid, fumaric acid, and a derivative of maleic anhydride; said maleic oil resin being solvated with the organic liquid dispersion medium and being block- or graft-copolymerized with a copolymerizable monomer having at least one site of ethylenic unsaturation, whereby the block- or graft-copolymer of said maleic oil resin with said copolymerizable monomer is stably dispersed in said organic liquid dispersion medium and the amount of the maleic oil resin is 25 to 90% by weight of the total solids of the polymer dispersion.

14. The synthetic polymer dispersion set forth in claim 13, wherein the organic liquid has an aniline point below 60° C. and an aromatic hydrocarbon content of less than 12% by weight.

15. The synthetic polymer dispersion set forth in claim 13, wherein in the maleic oil resin the ratio of the oil component is 80 to 95% by weight.

16. A process for the preparation of polymer dispersions, which comprises block- or graft-copolymerizing, for between 1–10 hours at a temperature between 50° C. and 140° C. a copolymerizable monomer having at least one site of ethylenic unsaturation in the presence of a maleic oil resin having an acid value of 30 to 200 and a molecular weight of about 100 to about 2000, formed by addition of an unsaturated fatty acid-containing oil and a compound selected from the group consisting of maleic anhydride, maleic acid, fumaric acid, and a derivative of maleic anhydride, said maleic oil resin being solvated with an organic liquid dispersion medium capable of dissolving the monomer but incapable of dissolving a polymer formed by polymerization of the monomer, so that the amount of the maleic oil resin is 25 to 90% by weight of the total solids of the resulting polymer dispersion.

References Cited

UNITED STATES PATENTS

| | | | |
|---|---|---|---|
| 3,317,635 | 5/1967 | Osmond | 260—881 |
| 3,335,102 | 8/1967 | Bussell et al. | 260—22 CB |
| 3,383,352 | 5/1968 | Duell et al. | 260—33.6 R |
| 3,607,821 | 9/1971 | Clarke et al. | 260—33.6 R |
| 3,620,989 | 11/1971 | Cummings | 260—22 CB |
| 3,634,351 | 1/1972 | Kimura et al. | 260—22 CB |
| 3,639,650 | 2/1972 | Cummings | 260—18 EP |
| 3,652,472 | 3/1972 | Clarke et al. | 260—22 CB |
| 3,707,516 | 12/1972 | Walus | 260—21 |

FOREIGN PATENTS

| | | | |
|---|---|---|---|
| 958,023 | 5/1964 | Great Britain | 260—33.6 R |
| 1,143,404 | 2/1969 | Great Britain | 260—33.6 R |

HOSEA E. TAYLOR, Primary Examiner

R. W. GRIFFIN, Assistant Examiner

U.S. Cl. X.R.

117—132 B, 132 BE, 161 K, 161 KP, 161 ZB; 260—18 EP, 18 TN, 22 EP, 22 TN, 33.6 R, 33.6 EP, 33.6 UB